E. M. AWREY.
Harvesters.

No. 140,804. Patented July 15, 1873.

Witnesses:

Inventor:
E. M. Awrey
Per
Attorneys.

UNITED STATES PATENT OFFICE.

ELGIN M. AWREY, OF CAISTOR, SMITHVILLE POST-OFFICE, CANADA.

IMPROVEMENT IN HARVESTERS.

Specification forming part of Letters Patent No. 140,804, dated July 15, 1873; application filed May 10, 1873.

*To all whom it may concern:*

Figure 1:
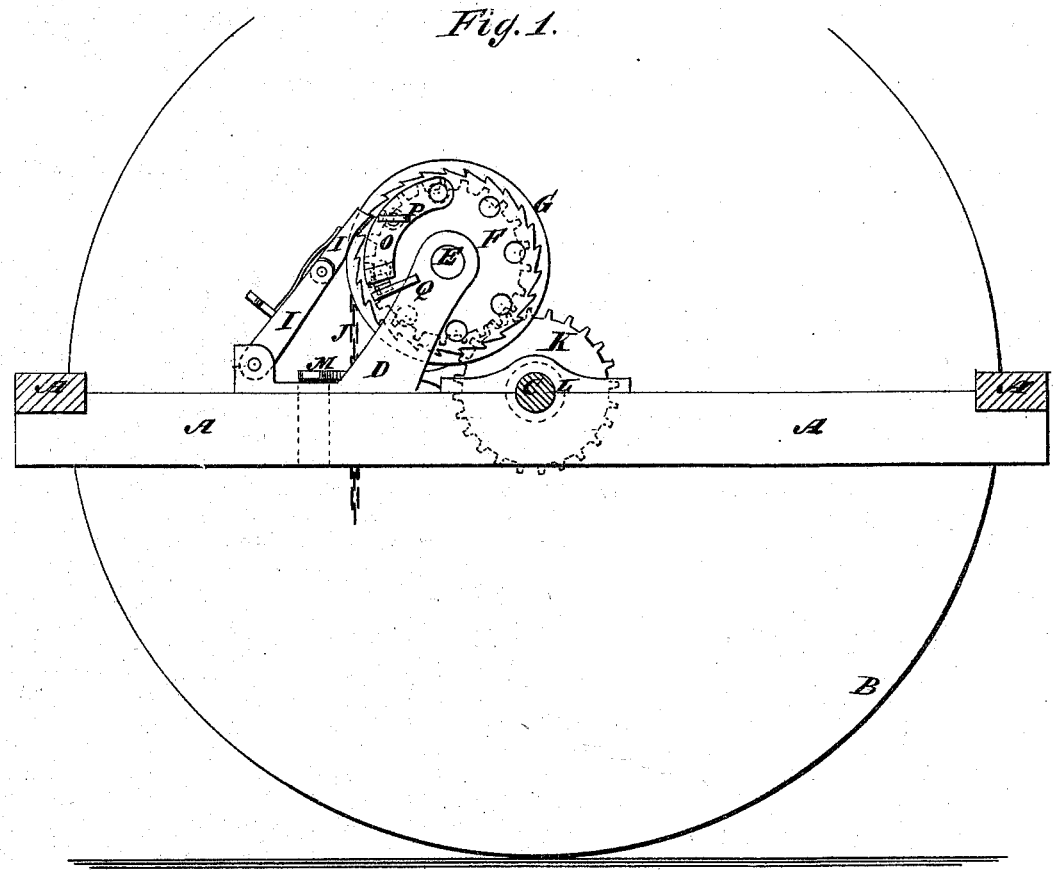
Figure 2:
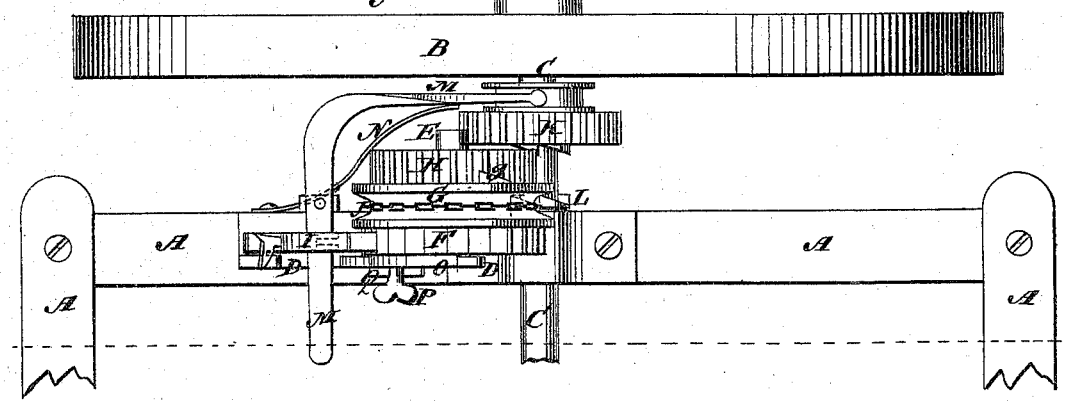
Figure 3:
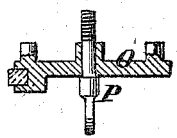

Be it known that I, ELGIN MONTCALM AWREY, of Caistor, (Smithville Post-Office,) in the county of Lincoln, province of Ontario and Dominion of Canada, have invented a new and useful Improvement in Reapers and Mowers, of which the following is a specification:

Figure 1 is a side view of my improved device, shown as applied to a harvester. Fig. 2 is a top view of the same. Fig. 3 is a detail section of the adjustable stop.

Similar letters of reference indicate corresponding parts.

My invention has for its object to furnish an improved device by means of which the table or finger-bar may be raised, when desired, by the advance of the machine, thus dispensing with the ordinary levers and keeping the machine free for the operation of the self-rake, and which shall at the same time be simple in construction, convenient in use, and reliable in operation. The invention consists in the combination of the compound wheel, the pawl, the chain, the loose gear-wheel, the clutch, the lever, and the spring with each other and with the axle and framework of a reaper or mower; in the combination of the adjustable block, the hand-screw, and the stop, with the compound wheel, pawl, chain, loose gear-wheel, clutch, lever, and spring; and in the combination of the inclined projection with the compound wheel and the loose gear-wheel, as hereinafter fully described.

A represents the frame-work; B, the drive-wheels; and C the axle of the machine. To the frame A is attached a bracket, D, to which is attached the journal E, upon which the compound wheel F G H revolves. The wheel F G H is made in three parts formed in one piece or rigidly attached to each other. The part F is a ratchet-wheel, upon the teeth of which rests the engaging end of the pawl I, which is pivoted to the frame-work A, and is jointed near its engaging end, said jointed end being held up by a spring, as shown in Figs. 1 and 2. The joint and spring of the pawl I allow it to yield sufficiently to be withdrawn from the teeth of the ratchet F when under strain. The middle part G of the wheel F G H is grooved to serve as a pulley to receive the chain J attached to the table or guard-bar of the machine, so that the said table or guard-bar may be raised by winding the chain J upon the said pulley G. The other part, H, of the wheel F G H is a gear-wheel, the teeth of which mesh into the teeth of the gear-wheel K, which runs loosely and slides freely upon the axle C, so that it may be readily thrown into and out of gear with the clutch L attached to the axle C, to cause the said axle to carry the said gear-wheel with it in its revolution, when desired. The hub of the gear-wheel K is grooved to receive the forked end of the bent lever M, which is pivoted to the frame A, and its other end projects into such a position that it may be conveniently reached and operated by the driver with his foot to throw the gear-wheel K into gear with the clutch L, so that the advance of the machine may turn the wheel F G H, wind up the chain J, and raise the table or guard-bar. N is a spring attached to the frame A in such a position that its free end may press against the inner side of the lever M near its forked end, so that when the pressure is removed from the said lever M the gear-wheel K may be thrown out of gear with the axle C by the action of the said spring N. To the side of the middle part G of the wheel F G H is attached an inclined projection, *g*, which, should the driver neglect to remove his foot from the lever M at the proper time, will strike against the side of the gear-wheel K and push it out of gear with the clutch L before there can be any breakage. O is a curved block, upon the inner side of which are formed two or more projecting pins, which enter holes in the side of the wheel F G H, where it is secured in place by a hand-screw, P, which screws into holes formed in the wheel F G H in the bottom of the holes in said wheel. The end of the stop-block O strikes against a stop, Q, attached to or formed upon the bracket D to support the table or guard-bar at any desired height above the ground, according as the block O may be adjusted.

Rubber blocks may be attached to the end of the block O and to the stop Q to diminish the shock when the said parts come in contact.

To the pawl I is attached a projection to receive the driver's foot to push back the pawl I when the table or guard-bar is to be dropped.

One or more of these devices may be used, according as the machine would require one or more levers, and they may be so arranged that one end of the table or guard-bar may be ascending while the other is descending.

Having thus described my invention, I claim as new and desire to secure by Letters Patent—

1. The combination of the wheel F G H, pawl I, chain J, loose gear-wheel K, clutch L, lever M, and spring N with each other and with the axle and frame-work of a reaper or mower, substantially as herein shown and described.

2. The combination of the adjustable block O, hand-screw P, and stop Q with the wheel F G H, pawl I, chain J, loose gear-wheel K, clutch L, lever M, and spring N, substantially as herein shown and described.

3. The combination of the inclined projection $g$ with the wheel F G H and gear-wheel K, substantially as herein shown and described.

ELGIN MONTCALM AWREY.

Witnesses:
   ROBERT THOMPSON,
   FLETCHER E. AWREY.